US008758048B2

(12) United States Patent
Nesme et al.

(10) Patent No.: US 8,758,048 B2
(45) Date of Patent: Jun. 24, 2014

(54) SUPPORT STRUCTURE FOR TELECOMMUNICATION JACKS

(75) Inventors: Mathieu Nesme, Sallanches (FR); Guy Metral, Cluses (FR)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/704,352

(22) PCT Filed: May 25, 2011

(86) PCT No.: PCT/US2011/037893
§ 371 (c)(1),
(2), (4) Date: Dec. 14, 2012

(87) PCT Pub. No.: WO2011/162905
PCT Pub. Date: Dec. 29, 2011

(65) Prior Publication Data
US 2013/0090005 A1  Apr. 11, 2013

(30) Foreign Application Priority Data
Jun. 22, 2010   (EP) ...................................... 10166785

(51) Int. Cl.
*H01R 13/60* (2006.01)
(52) U.S. Cl.
USPC ......................................... 439/540.1; 439/94
(58) Field of Classification Search
USPC ................ 439/540.1, 541.5, 532, 549, 94, 95
See application file for complete search history.

(56) References Cited

U.S. PATENT DOCUMENTS

| 4,647,129 | A  | * | 3/1987 | Kandybowski et al. | ....... 439/246 |
| 5,795,185 | A  | * | 8/1998 | Edgley et al. | ................. 439/545 |
| 5,957,720 | A  |   | 9/1999 | Boudin | |
| 6,332,806 | B1 | * | 12/2001 | Yasui et al. | .................. 439/545 |
| 7,547,230 | B1 | * | 6/2009 | Strausser et al. | ............... 439/545 |
| 7,878,824 | B2 | * | 2/2011 | Pepe et al. | ........................ 439/95 |
| 7,909,622 | B2 | * | 3/2011 | Pepe et al. | ........................ 439/95 |
| 2005/0191901 | A1 |   | 9/2005 | Follingstad | |
| 2008/0090461 | A1 |   | 4/2008 | Pepe | |
| 2009/0004913 | A1 | * | 1/2009 | Caveney et al. | ........... 439/540.1 |
| 2009/0034226 | A1 |   | 2/2009 | Herndon | |

FOREIGN PATENT DOCUMENTS

| EP | 0 638 207 B1 | 10/1996 |
| EP | 1 465 438 A1 | 10/2004 |
| EP | 1 478 056 A1 | 11/2004 |
| EP | 1 484 824 A2 | 12/2004 |
| EP | 2 034 565 A2 | 3/2009 |
| WO | WO 2008/074013 | 6/2008 |

* cited by examiner

*Primary Examiner* — Gary Paumen
(74) *Attorney, Agent, or Firm* — Kristofor L. Storvick

(57) ABSTRACT

In the field of telecommunication and data transmission, a jack support structure for fixing a plurality of modular telecommunications jacks on a patch panel. The jack support structure has at least two parallel rows of jack cavities, and fixing means for fixing the jack support structure on a patch panel, characterized by the fixing means being positioned only between two adjacent rows.

14 Claims, 12 Drawing Sheets

SUPPORT STRUCTURE FOR TELECOMMUNICATION JACKS

BACKGROUND OF THE INVENTION

1. Field of the Invention

This invention relates to a structure to fix jacks on a patch panel in telecommunication and data transmission applications.

2. Background

Patch panels are employed in telecommunication systems to enable the interconnections provided by a system to be changed as required. A patch panel typically has connector ports on the front side into which so-called patch cords can be plugged as required, and connector ports at the rear of the panel into which longer and more permanent cables are usually connected. Patch panels are often arranged on racks so that the connector ports on the front side of the panel are exposed and readily accessible. The connector ports at the rear of the panel may be accessible from the rear of the rack but, if that is difficult or impossible, provision must be made for access from the front of the panel. The connector ports of patch panels are typically equipped with jacks, which are fixed to the patch panels, and into which plugs at the end of patch cords can be plugged from the front of the patch panel.

Patch panels that are mounted to any standardized network rack and utilize one rack space are known in the telecommunications industry. A growing number of subscribers and a growing number of telecommunications services that are being offered require more and more interconnections, whereas the physical cabinet space available to accommodate patch panels remains limited.

Generally, telecommunication jacks are fixed to patch panels indirectly, in that a jack is fixed to a jack support structure which, in turn, is fixed on a patch panel. Such support structures often provide space for several jacks, one location for a jack often being shaped like a cavity.

There have been proposals for jack support structures in which jack cavities are arranged in rows, including a structure described in U.S. Patent Publication 2009/0034226A1 (Tyco), for example, which structure comprises a housing having a plurality of jack cavities and associated jack latch openings, where the housing is configured to be mated with a patch panel. That document also refers to a module assembly, wherein jack cavities are arranged in an upper row and a lower row. It further describes a latch mechanism on the housing for latching the module into the patch panel. The latch mechanism may optionally be releasably latched to the patch panel.

European Patent Publication EP 1465438 A1 (Panduit) describes a patch panel comprising, inter alia, a frame and a faceplate mountable into a rear side of the frame, where the faceplate has a plurality of modules, each having at least one modular jack retention latch. Faceplate retention latches allow the faceplate to be snap mounted into the rear side of the frame.

European Patent Publication EP 0 863 583 describes a socket of the modular jack type having insulation displacement contacts, a termination pusher for receiving strands of a cable and plugging in the rear of the socket, which is equipped with two jaws for receiving the pusher, which bring the pusher closer to the position of complete plug-in on the rear of the socket.

Known jack support structures with multiple rows of jack cavities can be fixed on patch panels using fixing means positioned either above and below the rows of jack cavities, i.e. in two different—horizontal—planes, or at the right end and at the left end of the rows, i.e. in two different—vertical— planes. The fixing means occupy space in each plane and, once mounted, they occupy space on the front surface of a patch panel in two planes.

SUMMARY

Because space in many telecommunication wiring cabinets is precious, it is desirable to minimize the space which a jack support structures occupies on the front surface of a patch panel. The present invention seeks to address this need.

The present invention provides a jack support structure for fixing a plurality of modular telecommunications jacks on a patch panel, wherein the jack support structure comprises at least two parallel rows of jack cavities, and fixing means for fixing the jack support structure on a patch panel, characterized by the fixing means being positioned only between two adjacent rows of jack support structures.

In the context of the present patent application, a jack cavity is a single opening in a jack support structure that can accommodate one modular telecommunications jack or a plurality of modular jacks. A jack cavity need not completely surround the accommodated jack(s) on all sides.

A jack support structure in accordance with the invention is fixed by fixing means positioned between two adjacent rows of jack cavities. No fixing means are present at the side of rows of jack cavities, and no fixing means are present above the top row or below the bottom row of jack cavities. In other words, no fixing means are required that are not positioned between the rows, which would otherwise occupy space that could not be used for placing jacks. The structure thereby occupies less space on the front surface of a patch panel to which it is fixed, and allows for a higher density of jack cavities on the front surface of the patch panel. Because the density of jacks on a patch panel can be increased, more modular telecommunications jacks can be fixed on a given patch panel front surface.

In a jack support structure according to the present invention, the fixing means may be releasable to allow the jack support structure to be removed from a patch panel. This arrangement is advantageous, because it enables easier and faster replacement, inspection or relocation of already-installed jack support structures. The simple release and removal of the jack support structure allows for installation of a new jack or new jacks in jack support structures which were not fully populated during initial installation of the patch panel. After installation of the new jack(s), the support structure can then be re-fixed to the patch panel. The ability to add jacks after initial patch panel installation allows a telecommunication company to defer costs until such time as a service connection is actually needed.

Fixing means may, for example, be one or more clips, screws, hooks, staples, rivets, latching mechanisms, fasteners, holders, thread mechanisms, magnetic mechanisms, or attachment assemblies.

In a jack support structure in accordance with the present invention, the jack cavities of one row may be aligned with the jack cavities of at least one other row, such that their edges are essentially in the same position, as measured in a direction along a row. This alignment can allow for a high density of jacks on the patch panel, and may permit a jack support structure to be manufactured from identical sub-modules, making manufacture and assembly of the jack support structure more cost-effective.

A jack cavity that does not completely surround the accommodated jack(s) on all sides may allow for easier installation of jacks or facilitate installation of jacks from the front side of a patch panel that are already connected to wires.

A jack support structure in accordance with an aspect of the invention may comprise a release actuator operable to release the jack support structure from the patch panel. A release actuator can be designed to provide for quick and reliable release of the jack support structure. An example of a release actuator is a button for manually disengaging fixing means, like, for example, a resilient latch, which fixes the jack support structure to the patch panel.

A jack support structure in accordance with a further aspect of the invention may comprise a release actuator which may comprise two arms, such that the jack support structure is released when both arms are moved towards each other. An advantage of this arrangement is that there is essentially no resulting force on the jack support structure when releasing it by pushing the two arms towards each other.

A jack support structure comprising a release actuator may further comprise a movable inhibitor that, in a first position on the support structure, inhibits actuation of the release actuator, and, in a second position on the support structure, allows actuation of the release actuator. A movable inhibitor with two functional positions can prevent inadvertent, unintentional actuation of a release actuator, for example in small wiring cabinets, and thus protect the integrity of the communication system. A movable inhibitor having a first position on the support structure for inhibiting and a second position on the support structure for allowing actuation is further beneficial in that the inhibitor does not need to be removed from the jack support structure for inhibiting or allowing actuation. This avoids the problem of the inhibitor being lost, for example in the clutter of cables and equipment that is typical of many wiring cabinets.

The movable inhibitor may be operable to be manually rotated from the first position to the second position and/or from the second position to the first position. Manual rotation is a simple, cost-effective and space-saving manner of actuating the inhibitor.

The inhibitor may have an indicia-receiving surface. The option to apply indicia to an element of the jack support structure saves space on the patch panel front surface because no separate indicia-bearing elements, which might occupy some of that precious space, need to be provided. It also allows for more efficient installation because the indicia need only be applied after initial installation of jacks and patch cables.

A jack support structure according to another aspect of the present invention may have a contact for electrically connecting a conductive part of a modular telecommunications jack to a conductive part of the patch panel. Such a contact may be instrumental in providing electrical ground to each jack and in achieving a considerable reduction in undesired electrical cross-talk between telecommunication lines and their associated jacks and plugs. The contact may be used for grounding or shielding or both. A contact on the jack support structure is further advantageous in that it may provide a defined zero voltage to the jack. There may be one contact for each jack cavity of a jack support structure, there may be one contact for a plurality of jack cavities of a jack support structure, or there may be one contact for all jack cavities of a jack support structure.

A contact as described above may have a first arm for contacting a jack in the jack support structure, and a second arm for contacting a patch panel to which the jack support structure is fixed. This shape may facilitate manufacturing and assembly of a jack support structure according to the present invention, because only one part needs to be fixed to the jack support structure.

The contact may be accommodated in a central wall between adjacent rows of jack cavities. Accommodating the contact in a central wall of a jack support structure can help to increase the jack density on a patch panel, because no extra space is required to accommodate the contact.

A modular telecommunications jack may be fixable to the jack support structure according to another aspect of the present invention by inserting the jack into the jack support structure from a rear side of the jack support structure which side faces the interior of a patch panel on which the jack support structure is to be fixed. A benefit of this feature is that a jack can be fixed to the jack support structure while the jack is connected to wires at its rear end, which may make maintenance and repair quicker and more cost effective.

A jack support structure according to a further aspect of the present invention may comprise two central walls, located between two adjacent rows of jack cavities, the central walls having major surfaces that are parallel to each other and parallel to the rows, the walls being suitably spaced to receive, in the space between them, a flat support element of a patch panel to which the jack support structure is to be fixed, whereby the central walls limit the movement of the jack support structure relative to the flat support element in a direction perpendicular to the major surfaces of the walls.

The central walls may thereby facilitate space-saving, yet stable fixing of the jack support structure to a patch panel. To that end, the central walls may be spaced such that the open distance between them is essentially equal to the thickness of a flat support element of the patch panel, to which the jack support structure is to be fixed. When the jack support structure is fixed, one central wall is located adjacent to one major surface of the flat support element, and the other central wall is located adjacent to the opposite major surface of the flat support element. This arrangement can help obtaining a tight fit and a secure fixation of the jack support structure to the patch panel and can contribute to achieving a high density of jacks on a patch panel.

In a combination of a jack support structure in accordance with the invention and a patch panel, the patch panel may comprise a flat support element that fits between two adjacent rows of jack cavities of the jack support structure. Thereby it provides a means to fix the jack support structure to the patch panel. The flat support element may be the only element of the patch panel that is used to fix jack support structures to the patch panel, thus making it unnecessary to provide further fixing elements on the patch panel, which facilitates higher density of jacks on the patch panel, and may save cost and weight of the patch panel, because only one support element is required.

The flat support element may have at least one recess in an edge, defining the location of the jack support structure(s) fixed thereon. The flat support element may have two types of recesses. One type of recess may be suitable for guiding a jack support structure when it is fixed to the patch panel, and the other type of recess may be suitable for securely fixing a jack support structure to the patch panel. Alternatively, a single type of recess may be suitable both for guiding a jack support structure when it is inserted into the patch panel and for securely fixing a jack support structure to the patch panel.

The jack support structure may be fixed on a patch panel by inserting the jack support structure into the patch panel in a direction towards the interior of the patch panel. Insertion of the jack support structure in a direction towards the interior of the patch panel, like, for example, from the front side of the patch panel is advantageous for installation, repair, and service, as the front side of a patch panel is often better accessible than its rear side, where only little space may remain between the cabinet wall and the racks containing patch panels.

In a further aspect, the invention provides a wire termination tool for securing a plurality of wires, held in a wire organizer of a modular jack, to respective insulation displacement contacts of the jack, the tool comprising a cavity shaped to receive the modular jack, and first and second levers, pivotably-movable over the cavity from opposite sides thereof, whereby, when the jack is located in the cavity and the levers are pivoted towards each other, the levers exert a force on the wire organizer to press it into the jack body and thereby push the said wires into the respective insulation displacement contacts.

The termination tool facilitates reliable, simple and quick termination of wires in the jack. The termination can be done manually by pressing the levers together in one movement. The tool can be operated with a single hand. The tool can be used many times. It makes a termination mechanism on individual jacks obsolete, which may save manufacturing cost.

BRIEF DESCRIPTION OF THE DRAWINGS

The invention will now be described in more detail with reference to the following Figures illustrating, by way of example, particular embodiments of the invention.

In the drawings.

DETAILED DESCRIPTION

Figure 1:
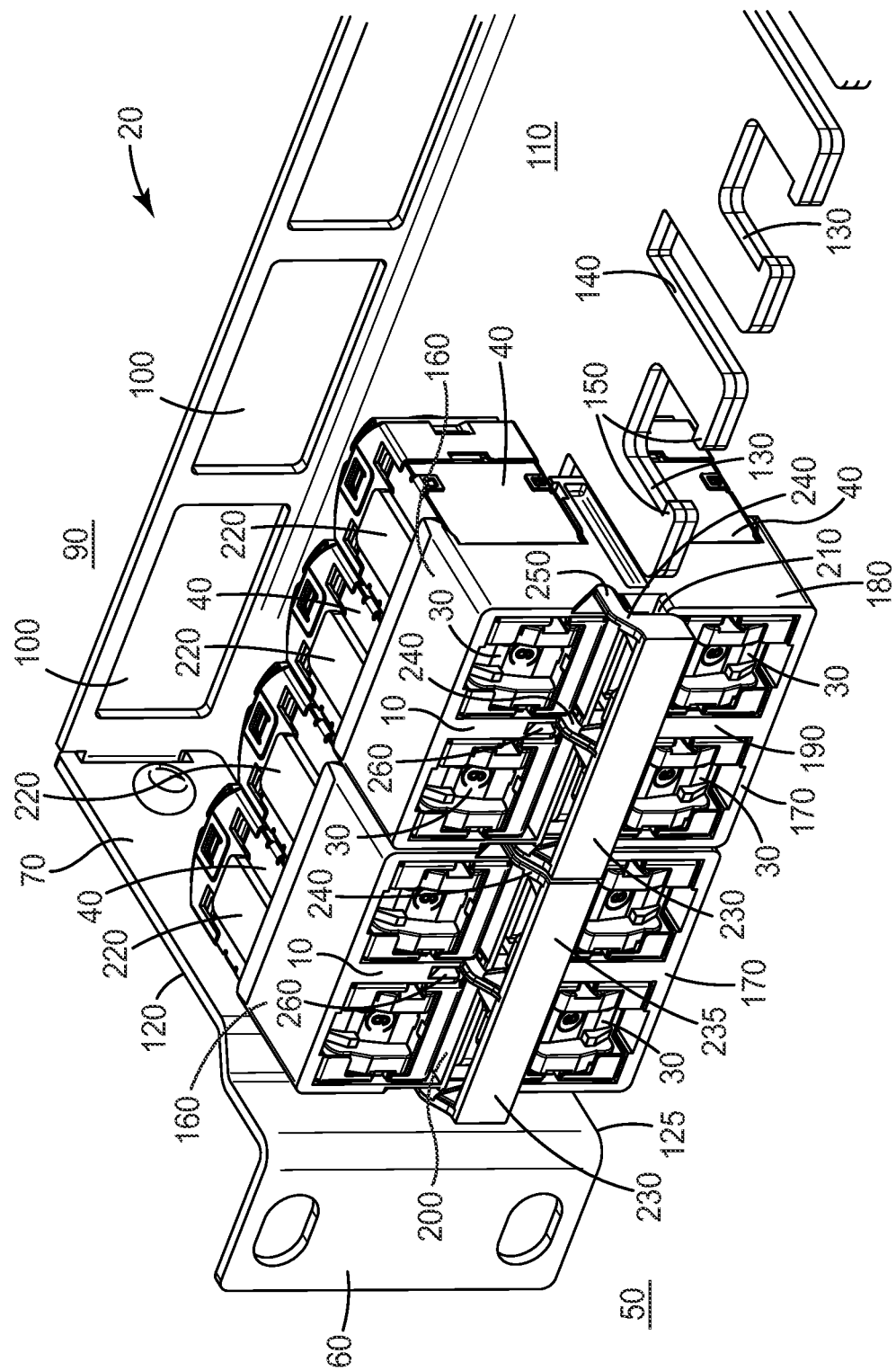
FIG. 1 is a perspective view of jack support structures according to the invention, fixed on a patch panel.

FIG. 1 is a perspective view of two jack support structures 10 according to the present invention, both jack support structures 10 being fixed to a patch panel 20. Each jack support structure comprises four jack cavities 30 containing respective modular jacks 40. In use, the patch panel 20 is mounted on a rack (not shown) commonly used in the industry today. Conventional racks, usable with the patch panels described herein can include a standard 19-inch equipment rack, a standard 23-inch equipment rack, a European-standard rack or other standard racks used around the world. Several patch panels 20 can be disposed in a stack within a rack with other similar panels, so that the jacks 40 are accessible at the front side 50 of the patch panel to receive patch cords for the purpose of making connections to cables incoming to the jacks from the rear side 90 of the patch panel.

The patch panel 20 and the jack support structures 10 will now be described in greater detail. The patch panel 20 has, on its front side 50, two flanges 60 disposed on either side of the patch panel 20 for attachment of the patch panel 20 to a rack (not shown). Side walls 70 connect the flanges 60 to a rear wall 80, which is located at a rear side 90 of the patch panel. Openings 100 in the rear wall 80 allow cables (not shown) to enter the patch panel 20 from the rear side 90, so that they can be connected to the modular jacks 40. The patch panel 20 has a central support element 110, mounted at the center height of the patch panel 20, halfway between a top edge 120 and a bottom edge 125 of the side walls 70. The support element 110 is also attached to the rear wall 80 of the patch panel 20. The flanges 60, side walls 70 and central support element 110 are made from sheet metal and are electrically conductive, such that they are suitable for grounding purposes.

The central support element 110 has, at its front edge, recesses 130, 140, that are suitably shaped to mate with corresponding fixing means of the jack support structures 10. These fixing means will be explained in more detail below. In this embodiment of the invention, there are two types of recesses: each recess 130 is of the first type and has, at its front end, two retention noses 150. The corresponding fixing means on a respective jack support structure 10 comprise latches 300, visible in FIG. 3, which engage with the retention noses 150 on the front edge of a flat support element when the jack support structure 10 is fixed on the patch panel 20. The retention noses 150 and the latches 300 cooperate to prevent accidental slipping of the jack support structure 10 out of the recess 130 towards the front side 50 of the patch panel 20.

Each recess 140 is of the second type and has no retention noses at its front end. Recess 140 guides the jack support structure 10 when the support structure 10 is inserted into patch panel 20 from the front side 50 of the patch panel 20. The recess 140 interacts with support struts 275 (shown in FIG. 3) in the jack support structure 10. One recess 140 accommodates one strut 275 of a first jack support structure 10 and one strut 275 of a second jack support structure 10, adjacent to the first jack support structure 10. The recess 140 has an essentially rectangular shape. It extends in its long direction from the front side 50 of patch panel 20 towards the rear side 90. Its width is smaller than its length, and its long axis is parallel to side wall 70. The depth of recesses 130 and 140, i.e. their respective extension towards the rear side 90, determines the position of the jack support structure 10 in the front/back direction of the patch panel 20.

The flat support element 110 forms an installation platform for the jack support structures 10. Because the flat support element 110 is connected to the side walls 70 and to the rear wall 80 of the patch panel 20, it also provides mechanical stability to the entire patch panel 20 against bending or torsion and can assist in counteracting any detrimental effect that the openings 100 in the rear wall 80 may have on the strength of the patch panel.

The jack support structures 10 each comprise an upper row and a lower row of jack cavities 30, wherein the upper row has two cavities 30 and the lower row has two cavities 30. The two rows of jack cavities 30 are parallel to each other. One jack support structure 10 has an outer frame comprising a top wall 160, a bottom wall 170, and two parallel side walls 180. The top wall 160 and the bottom wall 170 are oriented parallel to each other and parallel to flat support element 110, when the jack support structure 10 is fixed on the patch panel 20. The jack support structure 10 further has a separating wall 190 that extends from the top wall 160 to the bottom wall 170 and is parallel to the side walls 180.

Modular jacks 40 are mounted in each of the jack cavities 30. The jack cavities 30 are oriented such that the modular jacks 40 are mounted symmetrically with respect to the plane separating the two rows of jack cavities 30, i.e. the jacks 40 in the lower row of each jack support structure are mounted "upside down" with respect to the jacks 40 in the upper row.

Each of the jack cavities 30 shown is shaped to receive an RJ45-type jack. Each jack cavity 30 actually envelops an RJ45-type jack 40. In the top right jack cavity 30, about two thirds of the jack 40 are visible, including its front surface. About one third of the jack is enveloped by the side wall 180, the top wall 160, the separating wall 190 and an upper central wall 200 of jack cavity 30.

Each jack support structure 10 has two central walls 200, 210, arranged horizontally, parallel to each other and parallel to the top wall 160 and to the bottom wall 170 of the jack support structure 10. The upper central wall 200 forms the bottom wall of the two jack cavities 30 in the upper row of jack cavities 30 of jack support structure 10, and similarly the lower central wall 210 forms the top wall of the two jack cavities 30 in the lower row of jack cavities 30. The central walls 200 and 210 are thus arranged between the upper row and the lower row of jack cavities 30, and will be disposed one on either side of the flat support element 110 of the patch panel 20, when the jack support structure 10 is fixed thereon. The central walls 200, 210 thereby limit the movement of the jack support structure 10 in an up-down direction relative to the flat support element 110.

Arranged between the central walls 200 and 210 are the above-mentioned fixing means, described in more detail below, that fix the jack support structure 10 on the central support element 110 of the patch panel 20.

Figure 4:
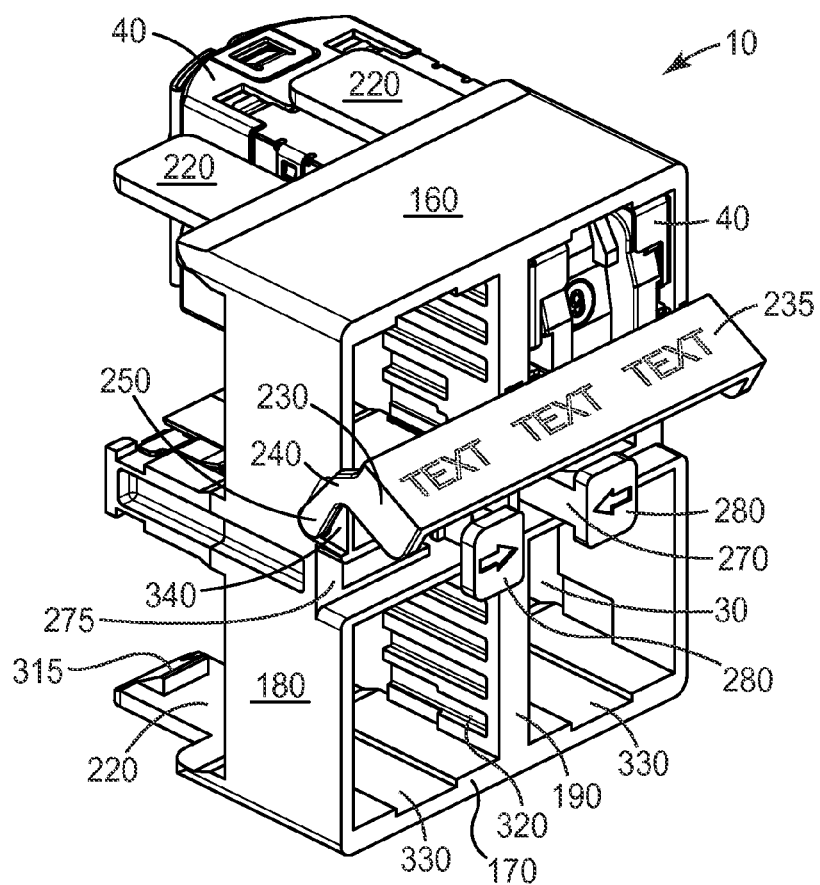
FIG. 4 is a perspective view of a jack support structure according to the invention, with a modular jack fixed to it, also showing release actuators and the inhibitor bearing indicia.

Jacks 40 are held in a jack support structure 10 by respective jack latches 220. Two jack latches 220 extend rearwardly from the top wall 160 of the jack support structure 10 for the jack cavities 30 in the top row, as shown in FIG. 4, and two jack latches 220 extend rearwardly from the bottom wall 170 for the jack cavities 30 in the bottom row. The jack latches 220 are flat, resilient, and essentially parallel to the top and bottom walls 160, and each is positioned centrally with respect to the jack cavity 30 to which it belongs. When a jack 40 is inserted into a jack cavity 30 from the rear of the support structure 10, a notch in the jack 40 engages with a latching hook 315 on the respective jack latch 220 and fixes the jack 40 in its position relative to the jack cavity 30 and the jack support structure 10. Each jack latch 220 can be flexed slightly to disengage it from the jack 40, so that the jack 40 can be removed from the jack cavity 30 by pulling it out towards the rear.

The fixing means for fixing the jack support structures 10 to the patch panel 20 are not visible in FIG. 1 (and will be described in FIG. 3), because each fixing means (and an associated release actuator, to be described below) is covered by a movable inhibitor 230. Inhibitor 230 extends over the full width of a jack support structure 10. It has, in the middle and at its respective side ends, three arms 240, each of which is rotatably attached to a respective wall 180, 190 of jack support structure 10 by a hinge 250. The arms 240 at the outer ends of the inhibitor 230 are rotatably attached to the side walls 180 of the jack support structure 10, and the arm 240 in the middle of the inhibitor 230 is rotatably attached to the separator wall 190, which provides a hinge hole 260 for that purpose. The inhibitor 230 is shown in FIG. 1 in its first position, from which it can be manually rotated upwards about the hinges 250 into a second position shown in FIG. 4. in which it allows actuation of the release actuator arm 270.

In the first position of inhibitor 230, its front surface 235 is oriented essentially in a plane parallel to the plane defined by flanges 60 of the patch panel 20, when the jack support structure 10 is mounted on patch panel 20. In the second position of inhibitor 230, its front surface is oriented essentially at an angle of about 45° with respect to the plane defined by flanges 60, as defined by rotation about hinges 250.

The front surface 235 of the inhibitor 230 is an indicia-receiving surface that, in FIG. 4, is shown provided with indicia. Typically, in practice, the indicia will comprise some text and a number that can uniquely identify each jack cavity 30. The indicia-receiving surface 235 of inhibitor 230 may be suitable for being written upon with regular pens or pencils. Alternatively, or in addition, it may be suitable for being printed upon, for example using inkjet, screen printing, or pad printing techniques and materials, or it may be suitable for receiving an adhesive label.

Figure 2:
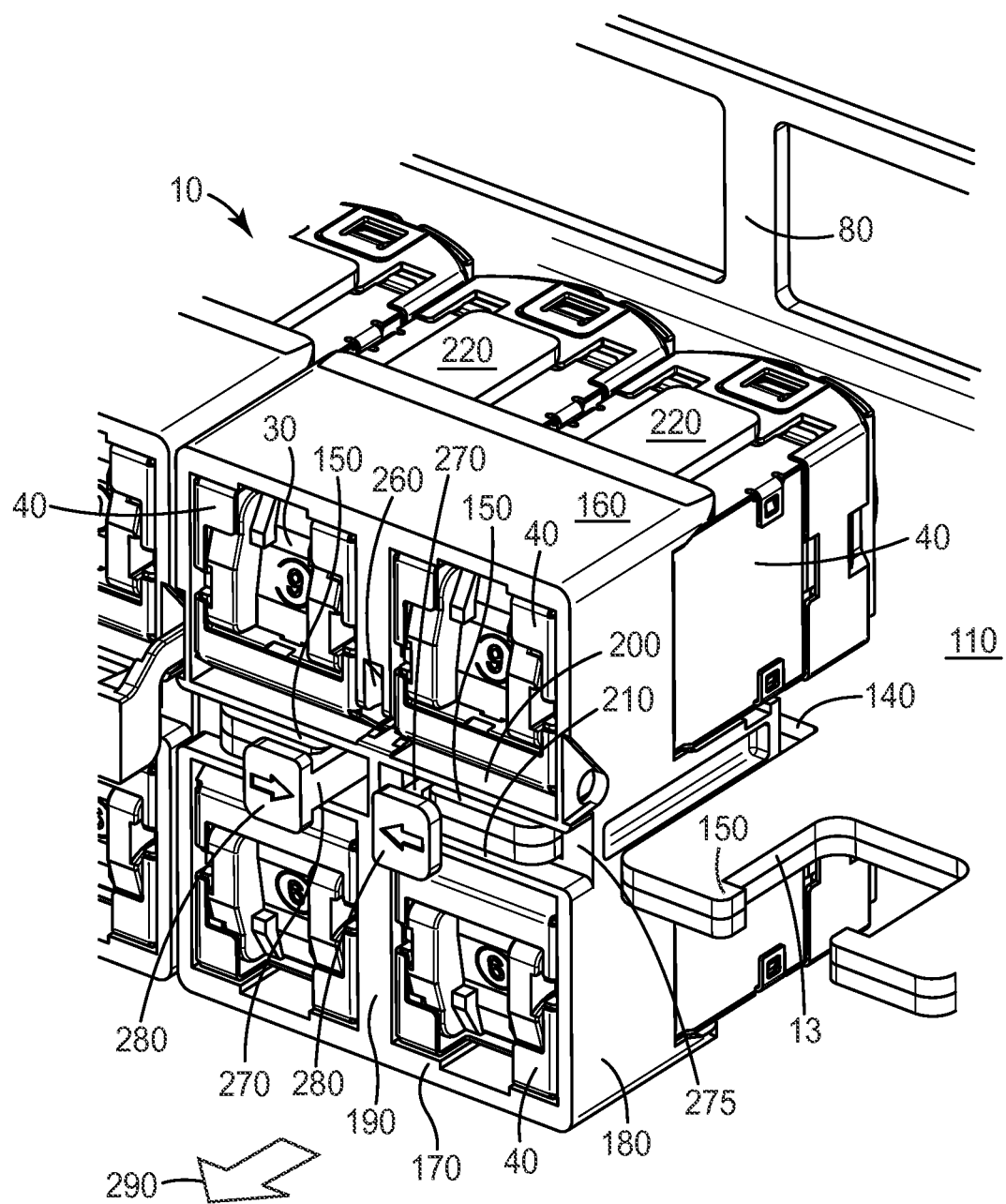
FIG. 2 shows one of the jack support structures of FIG. 1 in greater detail, with the inhibitor removed.

In FIG. 2 the jack support structure 10 according to the present invention is shown in greater detail, as fixed on patch panel 20. For clarity, the inhibitor 230 has been removed. A hinge hole 260 is now visible, which, as shown in FIG. 1, accommodates the hinge 250 of the inhibitor 230. Two arms 270 of a release actuator are now partly visible, each of them having, at its respective front end, a handle 280 which enables easy and reliable manual operation of the actuator as described below. The arms 270 extend from the front towards the rear of the jack support structure 10, as shown in the cross section in FIG. 3.

The release actuator arms 270 form part of the fixing means of the jack support structure 10. They are positioned between the central walls 200 and 210 of the support structure, and consequently they are positioned between the upper row and the lower row of jack cavities 30. Each of the arms 270 protrudes from the front of the jack support structure 10 so that they are easily accessible.

Each of the release actuator arms comprises a latch 300 (visible in FIG. 3) that engages with one of the retention noses 150 of the respective recess 130 in the central flat support element 110 of the patch panel 20. When both release actuator arms 270 are pressed towards each other by manually pushing their respective handles 280 towards each other, the respective latches 300 are disengaged from retention noses 150, and the same handles 280 can then be used to pull the jack support structure 10 away from the patch panel 20 in a forward direction, indicated by the arrow 290 in FIG. 2. The release actuator arms 270 are resilient, such that they return to their original position when they are released. The arms 270 may, for example, be made of a resilient polymeric material.

Each side wall 180 of a jack support structure 10 comprises, on its inner surface, a longitudinal support strut 275. It extends from the front of jack support structure 10 towards its rear. Support strut 275 is located in that part of each side wall 180, where this side wall 180 engages with the recess 140 of the central flat support element 110. It also provides guidance to the jack support structure 10 when it is inserted into the central flat support element 110. The spacing of recesses 140 on the central support element 110 is chosen such that the support strut 275 on one side of a jack support structure 10 fits snugly into a first recess 140, and simultaneously support strut 275 on the opposite side of a jack support structure 10 fits into a second recess 140. The support struts 275 limit the amount of side-to-side movement of the jack support structure 10 relative to the central flat support element 110 of the patch panel 20, when the jack support structure 10 is fixed on patch panel 20.

Figure 3:
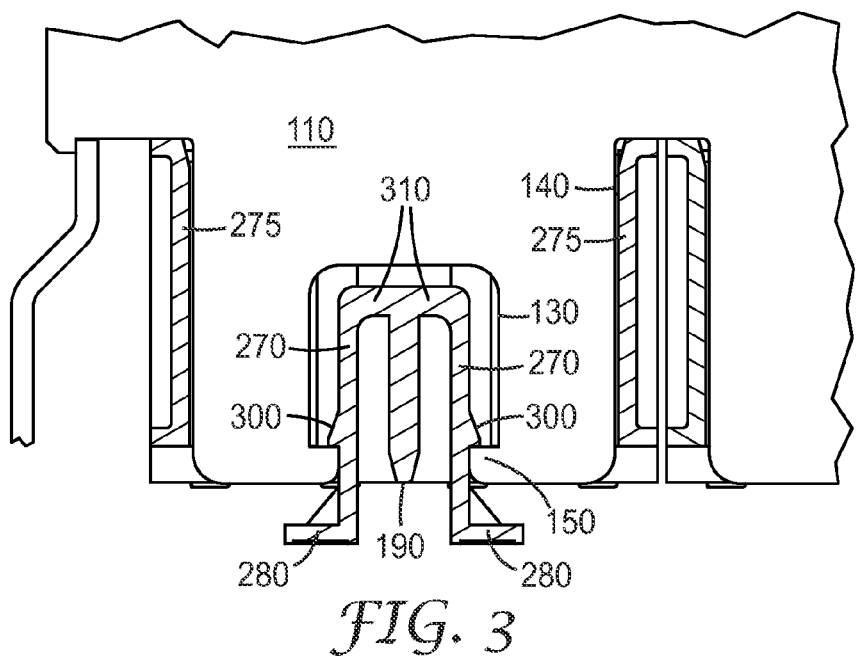
FIG. 3 shows a cross section of one of the jack support structures of FIG. 1, taken in the plane of the flat support element of the patch panel.

A cross section in the central plane of the jack support structure 10, fixed to the flat support element 110 of a patch panel 20, and its fixing means is shown in FIG. 3. In the normal positions of the release actuator arms 270, i.e. when they are not pressed towards each other, their respective latches 300 engage with the retention noses 150 of the recess 130 in the central support element 110 of the patch panel 20 as already described. The cross section of each latch 300 is shaped triangularly such as to facilitate easy insertion of the release actuator arms 270 between the retention noses 150 into the recess 130. At a certain depth of insertion, by virtue of the resilience of the release actuator arms 270, the latches 300 engage behind the respective retention noses 150. Due to the triangular shape of the latches 300, the release actuator arms 270 can not be pulled out of the recess 130 without pushing them towards the center line of recess 130, thereby disengaging the latches 300 from the retention noses 150.

Both release actuator arms are attached, at their respective rear sections 310, to the separating wall 190 of the jack support structure 10. The separating wall 190 has a tapered front edge in the region between the central walls 200, 210, to provide additional space for pressing the release actuator arms 270 together, when the jack support structure 10 is to be released from the patch panel 20.

In this exemplary embodiment, the fixing means comprises the structure consisting of the two rear sections 310, the two release actuators 270, the two latches 300, and the two handles 280. The fixing means can comprise other combinations of elements.

FIG. 4 is a three-dimensional view of a jack support structure 10 as shown in FIGS. 1 and 2, but with only one jack 40 mounted in the jack support structure 10. The jack support structure 10 has two rows of jack cavities 30, each row comprising two jack cavities 30, with one modular jack 40 fixed in the top right jack cavity 30, and with the inhibitor 230 being in its second position in which it allows actuation of the release actuator 270.

In this Figure, the jack latch 220 of the bottom left jack cavity 30 is visible. It can be seen that the latching hook 315 has a triangular cross section and is shaped like a ramp, the vertex of the ramp being oriented parallel to the front edge of the bottom wall 170. As already mentioned, the latching hook 315 engages with a corresponding notch (not visible) in a modular jack 40 when this jack 40 is inserted into the jack cavity 30 from the rear side of jack support structure 10. Once engaged, the latch 220 and the latching hook 315 keep the modular jack 40 in its position relative to the jack support structure 10 and prevent it from slipping out of its jack cavity 30 towards the rear side.

Longitudinal grooves 320 in the separator wall 190 extend from the rear end of wall 190 towards the front side of separator wall 190, but they end a short distance behind the front surface of wall 190. Their purpose is to provide a certain degree of resilience to the separator wall 190.

Each jack cavity 30 has a plug latch groove 330. For the jack cavities 30 of the top row, the latch groove 330 extends from the front surface of the top wall 160 towards the rear end of the jack cavity 30. For the jack cavities 30 of the bottom row, the latch groove 330 extends from the front surface of the bottom wall 170 towards the rear end of the jack cavity 30. Each latch groove 330 is wide enough to accommodate the latch which forms part of a standard RJ45 plug (not shown) when the RJ45 plug is inserted into a jack 40.

The inhibitor 230 can be swung around an axis parallel to its width direction, into an angular position in which it inhibits actuation of the release actuator arms 270, and into another angular position in which it allows actuation of the release actuator arms 270. FIG. 4 shows the inhibitor 230 in the position in which it allows actuation of release actuator arms 270. In this position, the handles 280 are accessible from the front side of the jack support structure 10 so that they can be manually operated. In the other position, in which the inhibitor 230 prevents actuation, the inhibitor 230 is positioned in front of the handles 280, so that these are not accessible from the front side of the jack support structure 10 and can not be manually operated.

The arms 240 and hinges 250 of the inhibitor are typically made of a resilient polymeric material. Each side arm 240 is thinner than the respective side wall 180 is, so that it can be accommodated in a hinge recess 340 formed in the side wall 180, both in the first and in the second position of inhibitor 230, as well as in the transition between these positions. In the area of a hinge recess 340, the respective side wall 180 is thinner. This is beneficial in that the overall width, as measured sideways, of the jack support structure 10, comprising inhibitor 230, is kept small, which contributes to keeping the size of the jack support structure 10 small in a horizontal direction, thereby allowing for a higher density of jack cavities 30 and thus of jacks 40 in that direction of a patch panel 20.

Figure 5A:
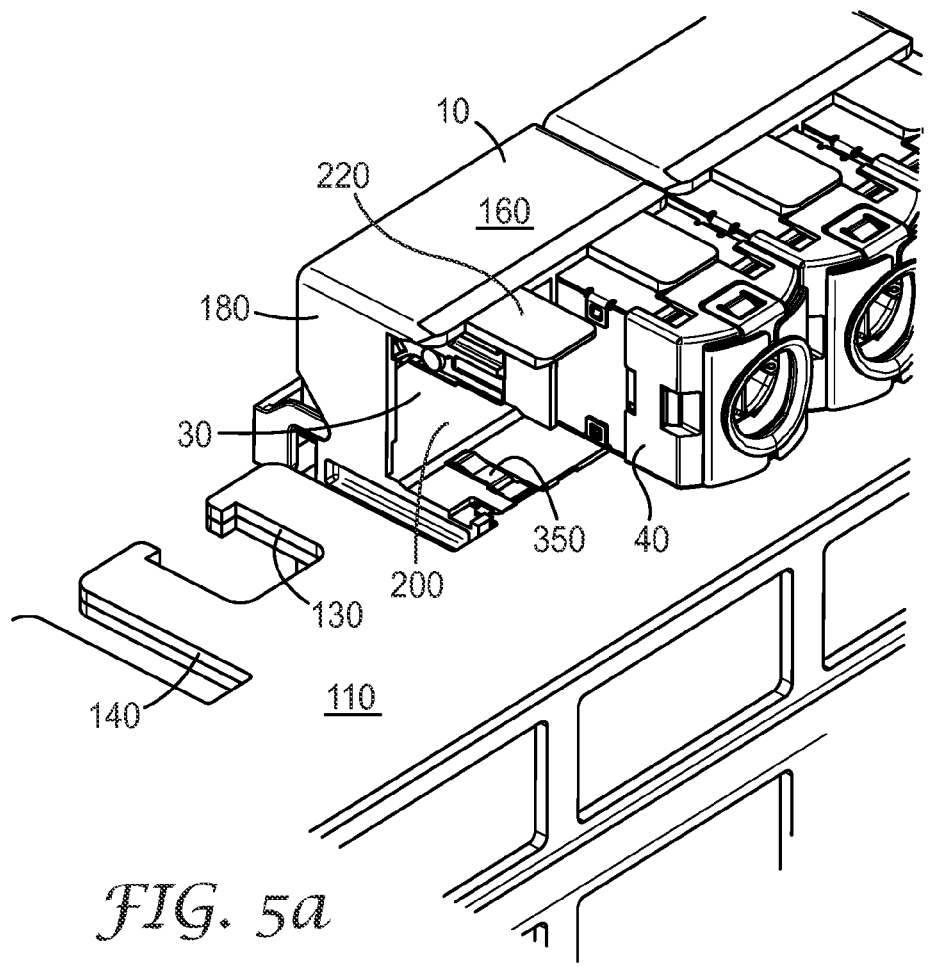
FIG. 5a is a perspective view of a jack support structure according to the invention comprising a contact in accordance with an aspect of the invention.
Figure 5B:
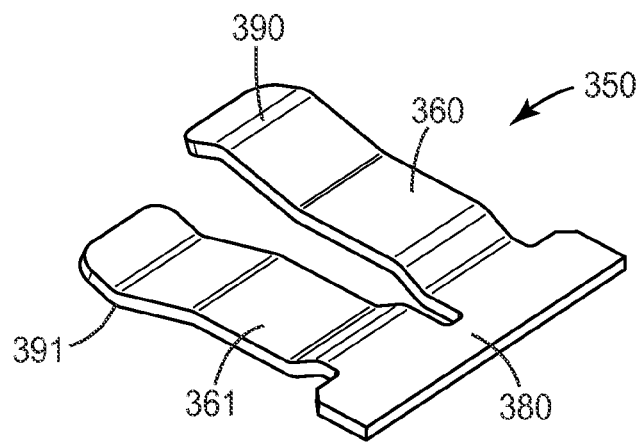
FIG. 5b shows the contact of FIG. 5a in greater detail.

FIG. 5a is a perspective view of the rear side of a jack support structure 10 mounted on a patch panel, in an embodiment of the invention where the jack support structure has a contact 350 (shown separately in FIG. 5b). The contact 350 has two arms 360, 361, protruding from a support bar 380. It is attached to the rear end of upper central wall 200 of the jack support structure 10 such that one arm 360 of contact 350 is located above the upper central wall 200, and the other arm 361 (not visible in FIG. 5a) is located below the upper central wall 200, and between the central flat support element 110 of the patch panel 20 and the upper central wall 200. Contact 350 is clipped into a suitably shaped recess 370 of the upper central wall 200, as shown in more detail in FIG. 5c.

Contact 350 provides an electrically conductive connection between the central support element 110 of the patch panel 20 and the jack 40, when the jack 40 is inserted into jack cavity 30. This conductive connection is obtained by virtue of the contact 350 being entirely or partly conductive or having a conductive surface, and by the contact 350 being in electrical contact with the central support element 110 with one of its arms 360, 361, and being also in electrical contact with the jack 40 with its other arm 361, 360, these arms being conductively connected by the support bar 380.

FIG. 5a shows, for clarity, only one empty jack cavity 30 and one contact 350, that provides electrical contact between central support element 110 and a jack 40 that is inserted into this jack cavity 30. However, all jack cavities 30 of jack support structure 10 are equipped with respective contacts 350. In other embodiments of the invention, only a subset of jack cavities 30 may have contacts 350.

FIG. 5b shows that the contact 350 is essentially U-shaped, with its two arms 360, 361 protruding generally perpendicularly from its support bar 380. The first arm 360 is shaped such as to extend out of the plane defined by the flat support bar 380 in one direction, whereas the second arm 361 is shaped such as to extend out of the plane defined by the support bar 380 in the opposite direction.

The contact 350 is resilient, such that when one arm 360, 361 is forced towards the plane defined by support bar 380, it strives to return into its original position. When a jack 40 is inserted into a jack cavity 30 equipped with contact 350, a part of the first arm 360 touches jack 40, that part is a contact area 390 of the first arm 360 and of contact 350. Similarly, when a jack 40 is inserted into a jack cavity 30 equipped with contact 350, the contact area 391 of the second arm 361 and of the contact 350 touches the central support element 110 of the patch panel 20. The contact areas 390, 391 of the contact 350 are conductively connected with each other, by virtue of the contact 350 being entirely conductive. The contact 350 can, for example, be made from bronze and can have a tin surface plating.

Figure 5C:
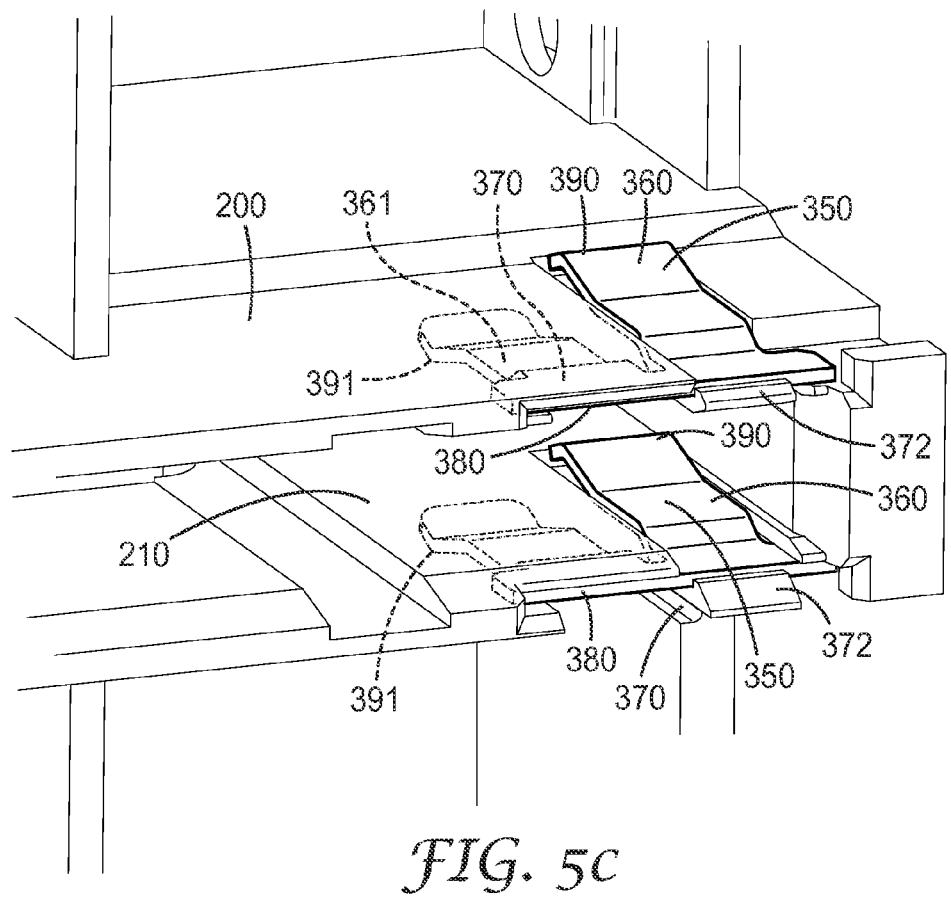
FIG. 5c is a detailed perspective view of two contacts, similar to the one of FIG. 5b, and how they are accommodated in central walls of a jack support structure.

FIG. 5c is an enlarged perspective view of the rear side of the jack support structure 10, where respective contacts 350 are attached to the upper central wall 200 and the lower central wall 210. The upper central wall 200 is provided with a recess 370, into which the contact 350 is inserted from the rear side of the jack support structure 10, and which holds it in place. A latch 372 prevents the contact 350 from being removed unintentionally. The latch 372 is comprised in the jack support structure 10. It is resilient and mechanically engages with the contact 350 once contact 350 is fully inserted into recess 370.

The contacts 350 are accommodated almost completely in the wall 200 and the wall 210, respectively. Only the raised portions in the vicinity of the respective contact areas 390, 391 stick out, as long as no jack 40 has been inserted into the respective jack cavity 30. When a jack 40 is inserted into the jack cavity 30, a part of the jack's outer surface slides over the contact area 390 or 391, thereby establishing an electrical contact between the jack 40 and the contact 350, and presses the respective arm 360, 361 which it contacts into the respective recess 370 of the respective central wall 200, 210 of jack support structure 10.

Similarly, when the jack support structure 10 is inserted into the central support element 110 of the patch panel 20, the respective contact surfaces 390, 391 of the arms 360, 361 of the contacts 350 slide over the surface of the central support element 110, thereby establishing an electrical contact between the central support element 110 and the contact 350, and the central support element 110 presses the respective arm 360, 361 which it contacts into the respective recess 370 of the respective central wall 200, 210 of the jack support structure 10.

The visible contact area 390 on the upper arm 360 of the upper contact 350, attached to the upper central wall 200, contacts a jack 40 (not shown) when the jack 40 is inserted into the upper jack cavity 30, whereas the contact area 391 on the lower arm 361 of the upper contact 350 (not visible in this Figure) contacts the central support element 110 (not shown) of the patch panel 20. Likewise, the visible contact area 390 on the upper arm 360 of the lower contact 350, attached to the lower central wall 210, contacts the central support element 110 (not shown) of the patch panel 20, whereas the contact area 391 on the lower arm 361 of the lower contact 350 (not visible in this Figure) contacts the jack 40 (not shown) when that jack 40 is inserted into the lower jack cavity 30.

The embodiment shown in FIG. 5a helps minimizing the space required by a jack support structure 10 on the front of a patch panel 20 by having the fixing means exclusively located in the space between the two rows of jack cavities 30. No fixing means are located above the upper row of jack cavities 30 or below the lower row of jack cavities 30, which reduces the amount of space required in a vertical direction on the front of a patch panel 20. Accommodating further elements of the jack support structure 10 like the jack latches 220 and the contacts 350 such that they do not protrude from the contour of the jack support structure 10 defined by the walls 160, 170, 180 of the jack support structure supports this objective.

Figure 6A:
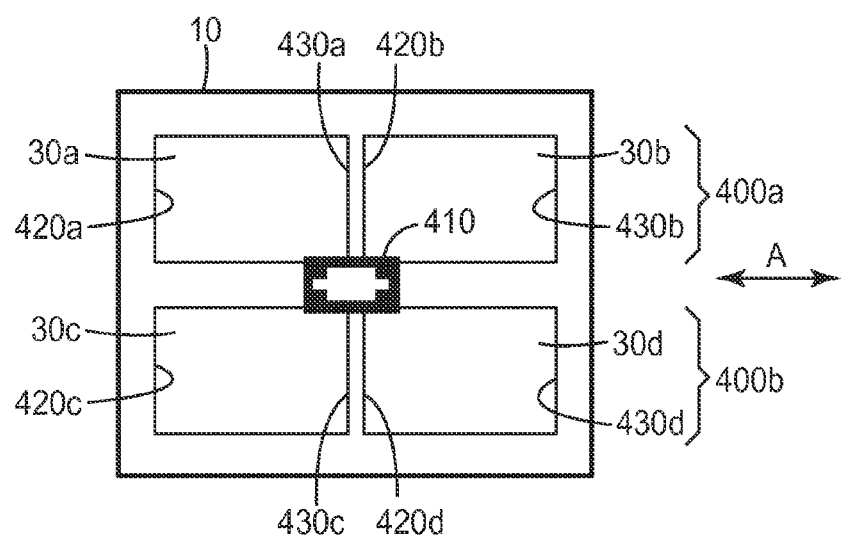
FIG. 6a is a schematic front view of a jack support structure according to the invention, comprising two rows of jack cavities and the location of a fixing means between the rows.

The jack cavities 30 can be arranged in different ways in a jack support structure 10 according to the present invention. FIG. 6a is a schematic representation of a preferred embodiment of the invention, where a jack support structure 10 comprises two rows 400a, 400b, of jack cavities 30, each row 400a, 400b comprising two jack cavities 30. The upper row 400a comprises the jack cavities 30a and 30b, the lower row 400b comprises the jack cavities 30c and 30d. A fixing means 410 is arranged between the upper row 400a and the lower row 400b of jack cavities 30. The fixing means 410 may comprise, for example, a release actuator arm 270, shown in FIG. 2. The jack cavities 30a, 30b, of the upper row 400a are aligned with the jack cavities 30c, 30d of the lower row 400b.

Figure 6B:
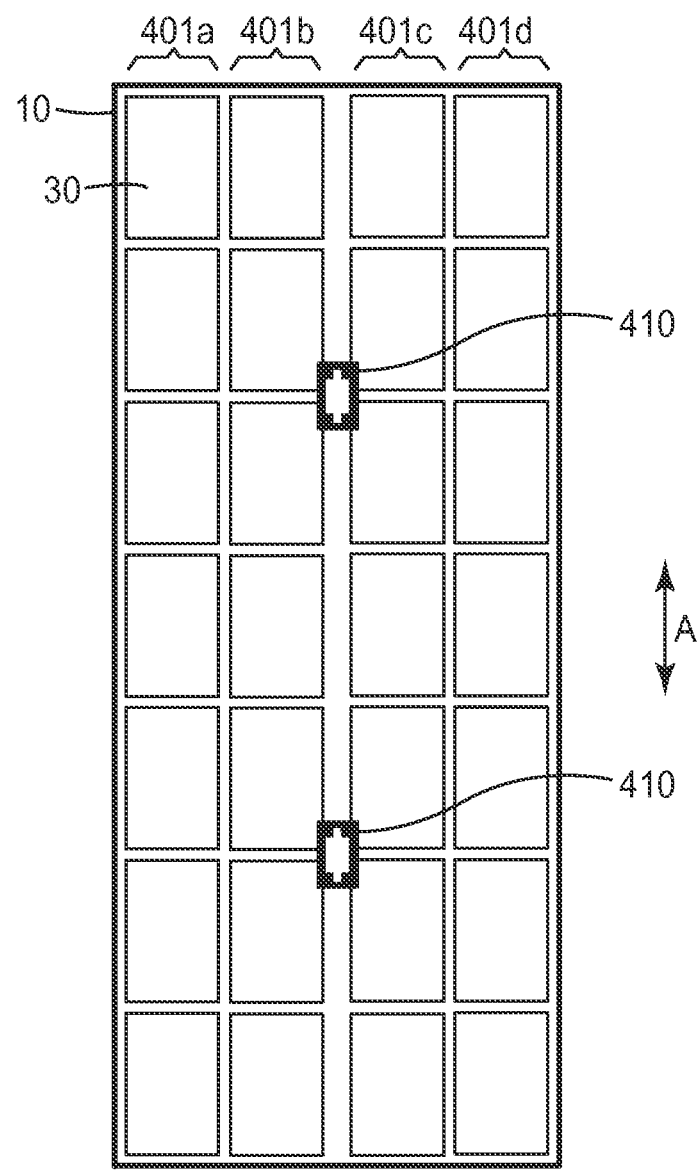
FIG. 6b is another schematic front view of an alternative jack support structure according to the invention.

FIG. 6b shows an example of a single jack support structure 10 according to the present invention, as seen from the front, which has four rows 401a, 401b, 401c and 401d of jack cavities 30. These four rows 401a, 401b, 401c and 401d are oriented vertically. The fixing means 410 are positioned only between the two adjacent rows 401b and 401c.

The embodiments shown in FIGS. 6a and 6b help minimizing the space required by a jack support structure 10 on the front of a patch panel 20 by having the fixing means 410 exclusively located between two specific rows 400, 401 of jack cavities 30, because this arrangement allows keeping the space between other rows 400, 401 small, since no fixing means need to be accommodated between those other rows 400, 401.

In order to strengthen the fixation of the jack support structure 10 to the patch panel 20, several fixing means may be accommodated between two specific rows 400, 401 of jack cavities 30, without this requiring additional space on the front of the patch panel 20.

Figure 7A:
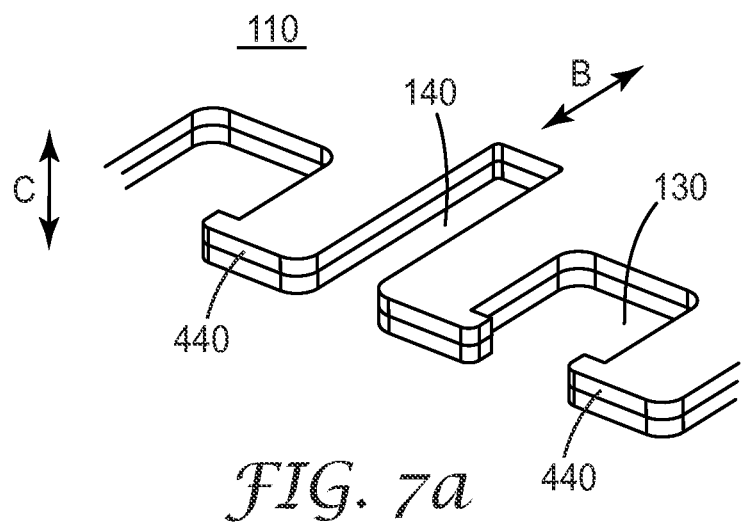
FIG. 7a is a perspective view of recesses in the flat support element in a patch panel, by which jack support structures can be fixed to the patch panel.

FIG. 7a is a detailed view of the recesses 130 and 140 of the central support element 110 of the patch panel 20. The basic functionality of these recesses 130, 140 has been discussed in the context of FIGS. 1 and 3 above. Both sides of the jack support structure 10 are guided by recesses 140 of the first type, so that the jack support structure 10 is attached to the flat support element 110 in a total of three recesses: one recess of the first type, two of the second type. In other embodiments of the invention, the jack support structure 10 may be attached to the flat support element 110 in less than three recesses.

Figure 7B:
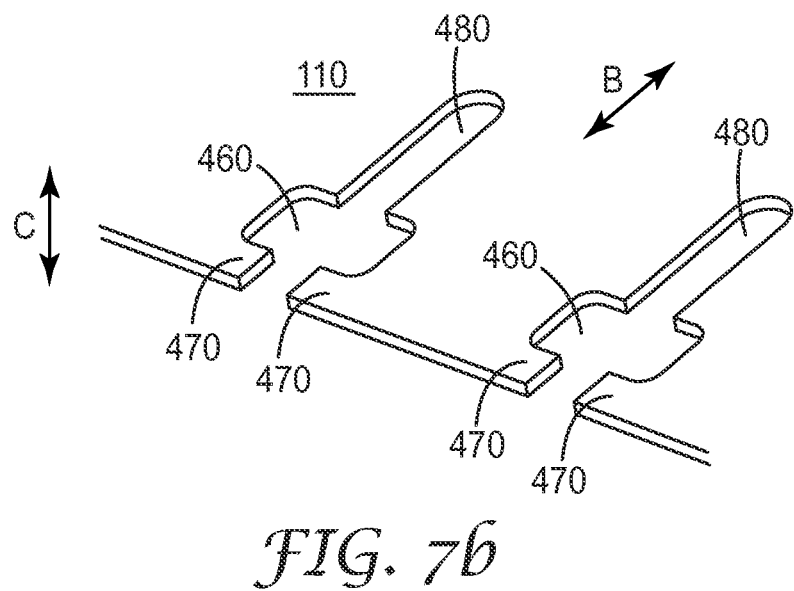
FIG. 7b is a perspective view of similar recesses, but having an alternative shape.

A second exemplary type of recess 460 is shown in FIG. 7b. The recess 460 has two retention noses 470, which can interact with the latches 300 of the release actuator arms 270 of the jack support structure 10, as explained above in the context of FIG. 3. In a rear part 480, the recess 460 is linearly-shaped to guide the jack support structure 10 as it is fixed on the patch panel 20. In this embodiment, the jack support structure 10 is attached to the patch panel 20 in a single recess 460, which provides for both longitudinal guidance and a releasable fixing. As a skilled person understands, the jack support structure 10 will be shaped appropriately to mate with recess 460.

Both in FIG. 7a and in FIG. 7b, the recesses 130, 140, 460, 480 in the central support element 110 guide a jack support structure 10 when it is inserted into patch panel 20. Guiding in an up-down direction, indicated by arrow C, is provided by the same recesses 130, 140, 460 and their interaction with the central walls 200, 210 of the jack support structure 10. The height of the open space between the upper central wall 200 and the lower central wall 210 corresponds essentially to the thickness of the flat central support element 110. If the open space between the central walls 200, 210 is only marginally higher than the thickness of the element 110, the jack support structure 10 will have a tight fit in an up-down direction with the flat support element 110.

In order to increase the density of modular jacks 40 on the front surface of a patch panel 20, it is desirable to minimize the space between the upper central wall 200 and the lower central wall 210. However, this would require the flat support element 110 of the patch panel 20 to be thinner. A thinner support element 110 provides less mechanical support to the jack support structures 10 fixed to it, and to the jacks 40, plugs and cables fixed directly or indirectly to the flat support element 110. Hence the skilled person will carefully select the thickness of the flat support element 110 and the material it is made of.

Figure 8A:
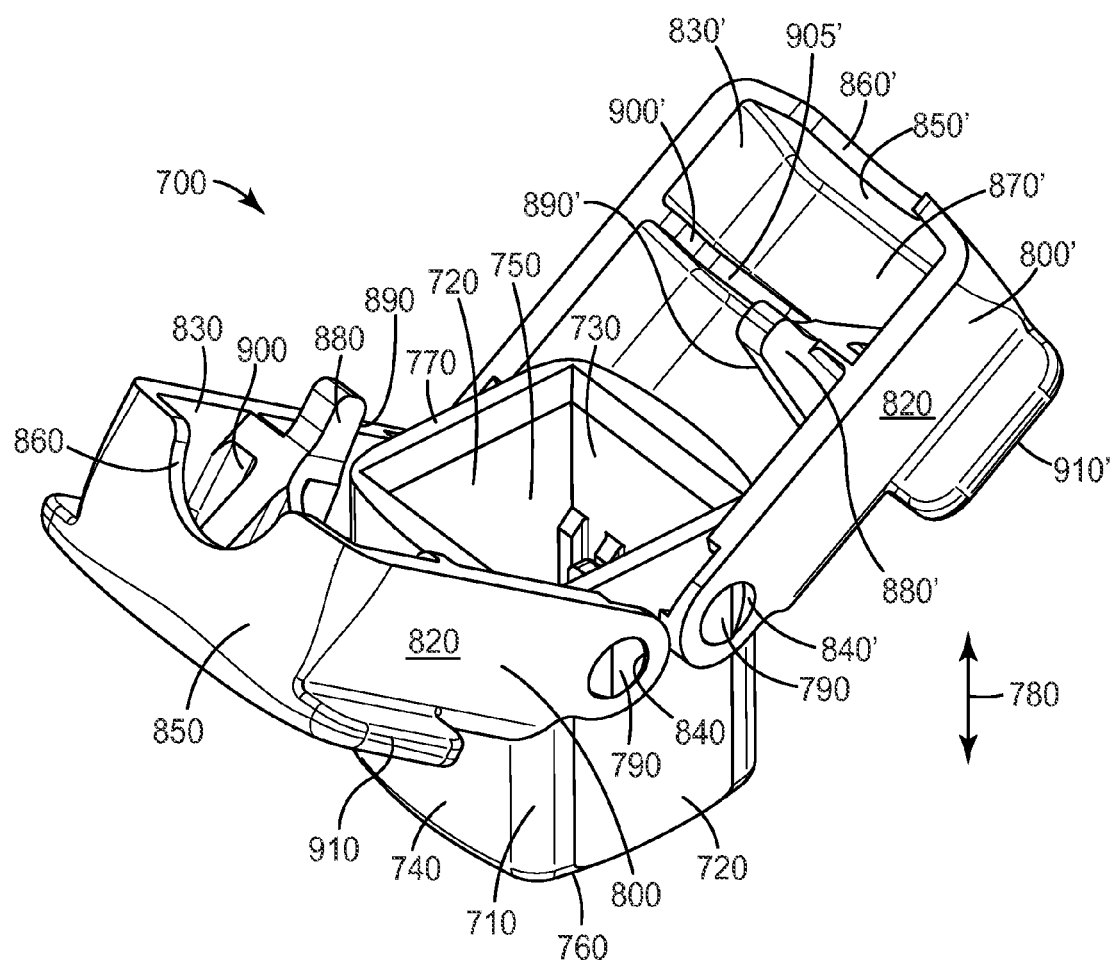
FIG. 8a is a perspective view of the wire termination tool in accordance with an aspect of the invention in an open position.

FIG. 8a is a 3-dimensional representation of the rear side of a termination tool 700, which allows for quick, reliable connection of electrical wires to electrical contacts of a telecommunications jack 40. The tool 700 can be used repeatedly to terminate wires on jacks 40, or, in other words, to securely connect wires mechanically and electrically to contacts in jack 40.

The tool 700 comprises a body 710 and two actuators 800, 800'. Body 710 comprises side walls 720, top wall 730 and bottom wall 740. These walls 720, 730, 740 form a cavity 750, suitably shaped to accommodate a telecommunications jack 40, for example a jack of the familiar RJ45 type. Although the tool 700 shown in this Figure has an essentially rectangular cavity 750 to accommodate an RJ45 type jack, the cavity 750 may have other shapes, for example a round shape or an oval shape, to accommodate other types of jacks 40.

The walls 720, 730 and 740 extend far enough from their respective front ends 760 to their back ends 770 to envelope a jack 40 to a large extent of the length of jack 40, as measured from front to back, for example, to more than half of the length of the jack 40. The cavity 750 formed by walls 720, 730, 740, is shaped suitably and has dimensions suitable to envelope jack 40 tightly, but without limiting the movement of jack 40 in the front—back direction, indicated by arrow 780.

The walls 720, 730, 740 have tapered edges at their respective rear ends 770 in order to facilitate manual introduction of a jack 40 into the cavity 750. The front of cavity 750 may be open or it may be closed by a wall (not shown). It is advantageous for the tool to have its cavity 750 closed by a wall on its front side, because this allows the jack 40 to be inserted into the cavity 750 of tool 700 from the rear side of the tool, until the front of the jack 40 abuts the front wall of the cavity 750. In this position, jack 40 is in a well-defined position relative to the tool 700 and its elements, which makes the operation of the tool 700 more convenient and more reliable.

Each side wall 720 provides two hinge studs 790 for pivotable attachment of two actuators 800, 800' to the body 710 of the tool 700.

In the embodiment shown in FIG. 8a, the actuator 800 and the actuator 800' have an identical shape. For this reason, only actuator 800 will be described in detail.

Actuator 800 comprises side walls 820, 830, each having a respective circular hole 840 for engagement with a respective hinge stud 790, such that the actuator 800 can be pivoted around the axis defined by the hinge studs 790 with which it is engaged. It can be pivoted sufficiently to enable jack 40 to be inserted into cavity 750 from the rear side of tool 700. The actuator 800 further comprises a back wall 850, attached to the side walls 820 and 830. The back wall 850 provides a semi-circular recess 860, through which those wires (not shown) can enter the tool that are to be connected to the contacts of the jack 40.

The actuator 800 comprises a bottom wall 870 (not visible in FIG. 8a) which is attached to walls 820, 830 and 850. In the open position of the tool, shown in FIG. 8a, the walls 820, 830, 850 and 870 of actuator 800 form an open trough. Inside this trough, a longitudinally extending lever 880 is arranged that protrudes perpendicularly from wall 870. The lever has a lateral width that corresponds to the width of a surface on a wire organizer 950 which is part of jack 40 after installation, and which serves to push wires into the contacts of jack 40 (FIGS. 8b and 8c explain this mechanism in more detail). The front surface 890 of lever 880 is flat and smooth, so that it can easily slide over the corresponding sliding surface 980, 980' of the wire organizer 950. The lever 880 is firmly attached to wall 870 at its one end. Lever 880 is supported, at its back side, by an interior wall 900, which extends from side wall 820 to side wall 830 and is parallel to the back wall 850. The interior wall 900 has a central recess 905, aligned with the recess 860, to allow those wires 965 to enter the tool 700 and the jack 40 that are to be connected to the contacts of jack 40, both in the open and in the closed position of tool 700.

The levers 880 and 880', respectively, are displaced laterally from the center of the interior wall 900, such that each of them is aligned with the respective corresponding sliding surfaces 980, 980' of the wire organizer 950, that will be discussed in detail below.

The distance between the interior wall 900 and the pivot hinge hole 840 is chosen such that the tool 700 can only be brought into its closed position if the wire organizer 950 has been pushed deep enough into the body 960 of jack 40 for the wires 965 to be securely connected to the contacts of jack 40. If the wire organizer 950 has not been inserted deeply enough into the body 960 of jack 40, the interior wall 900 and the lever 880 prevent complete closing of the tool 700.

The tool 700 is, in the embodiment shown in FIG. 8a, to be brought from its open position into its closed position manually. An operator, a technician, or the like, is required to insert wires 965 into the wire organizer 950, insert the body 960 of a jack 40 into the tool 700 while the tool 700 is in its open position, manually insert the wire organizer 950 partly into body 960 of jack 40, and manually pivot the actuators 800 and 800' towards each other simultaneously, thus bringing the tool 700 into its closed position and thereby inserting the wire organizer 950 into the body 960 of jack 40, whereby the wires 965 are securely connected to respective contacts in the jack 40.

In order to facilitate the pivoting of the actuator 800 and thus the closing of the tool 700, the actuator 800 is equipped with a grip element 910 located close to the end of the actuator 800 which is opposite to its hinged end. The grip element 910 is an essentially plate-like, flat element, connected with the bottom wall 870 or forming one part with it, and located on the side of the bottom wall 870 opposite to the side to which the lever 880 is attached. It may be advantageous to arrange the grip element 910 centrally over the lever 880, as this arrangement avoids distortion of the tool 700 when pressure is exerted on the grip element 910 to close the tool 700. In its plane, the grip element 910 may extend in one or more directions beyond the trough formed by the walls 820, 830, 850 and 870 of the actuator 800.

Figure 8B:
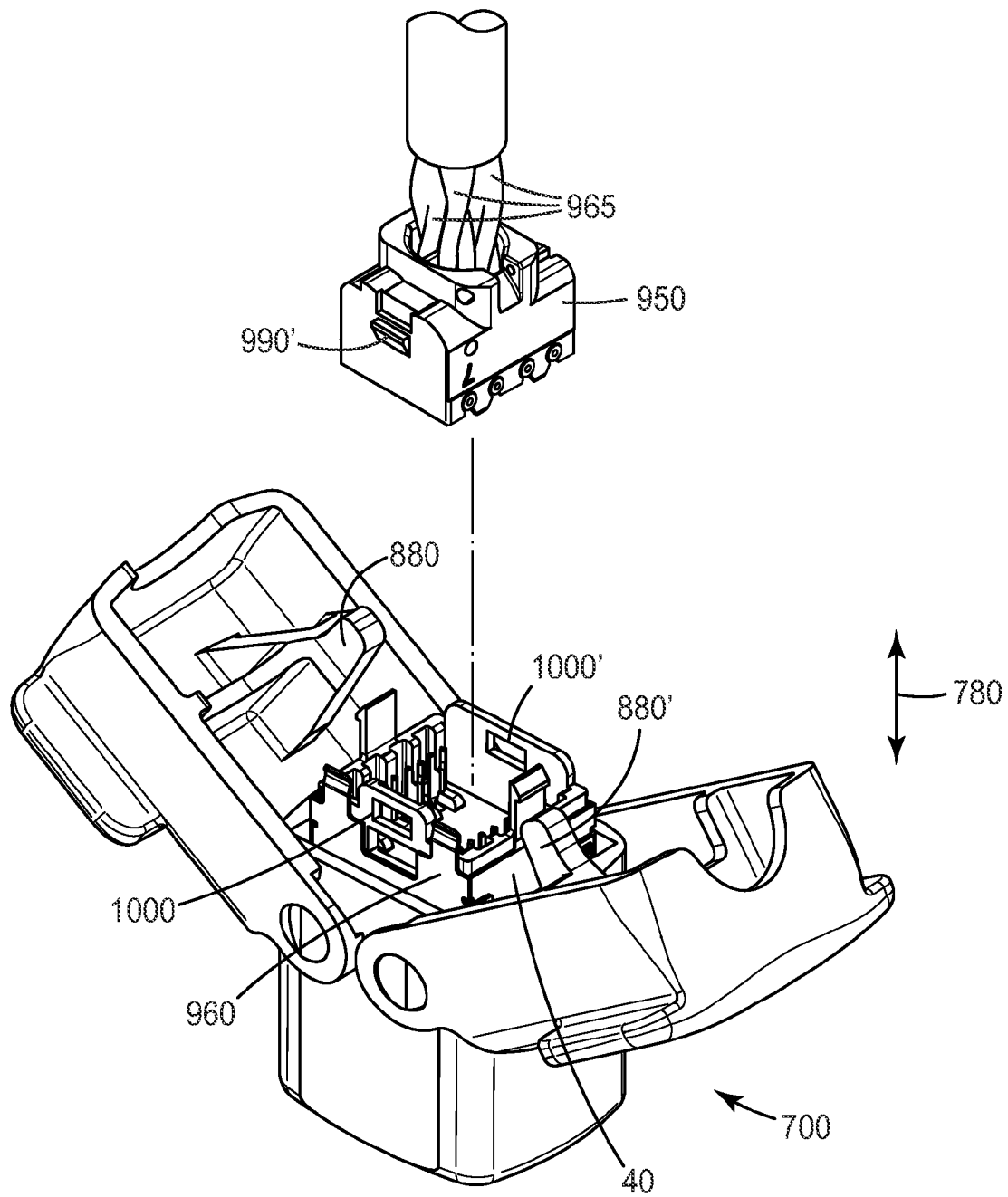
FIG. 8b shows, in perspective view, the tool of FIG. 8a with a jack inserted and a wire organizer.

FIG. 8b shows the tool 700 in its open position, with the body 960 of the telecommunications jack 40 inserted into the cavity 750 of the tool 700. The wires 965 are inserted into the wire organizer 950. The wire organizer 950 is not inserted into the body 960 of the jack 40. The wire organizer 950 has latch protrusions 990, 990' located on opposite sides of the wire organizer 950. The latch protrusions 990, 990' have a triangular cross section, which allows for secure and irreversible engagement with corresponding elastic latches 1000, 1000' on the jack body 960. The positions of the latch protrusions 990, 990' in the direction indicated by the arrow 780 is chosen such that they can engage with respective latches 1000, 1000' only when the wire organizer 950 has been completely inserted into the body 960 of the jack 40.

Figure 8C:
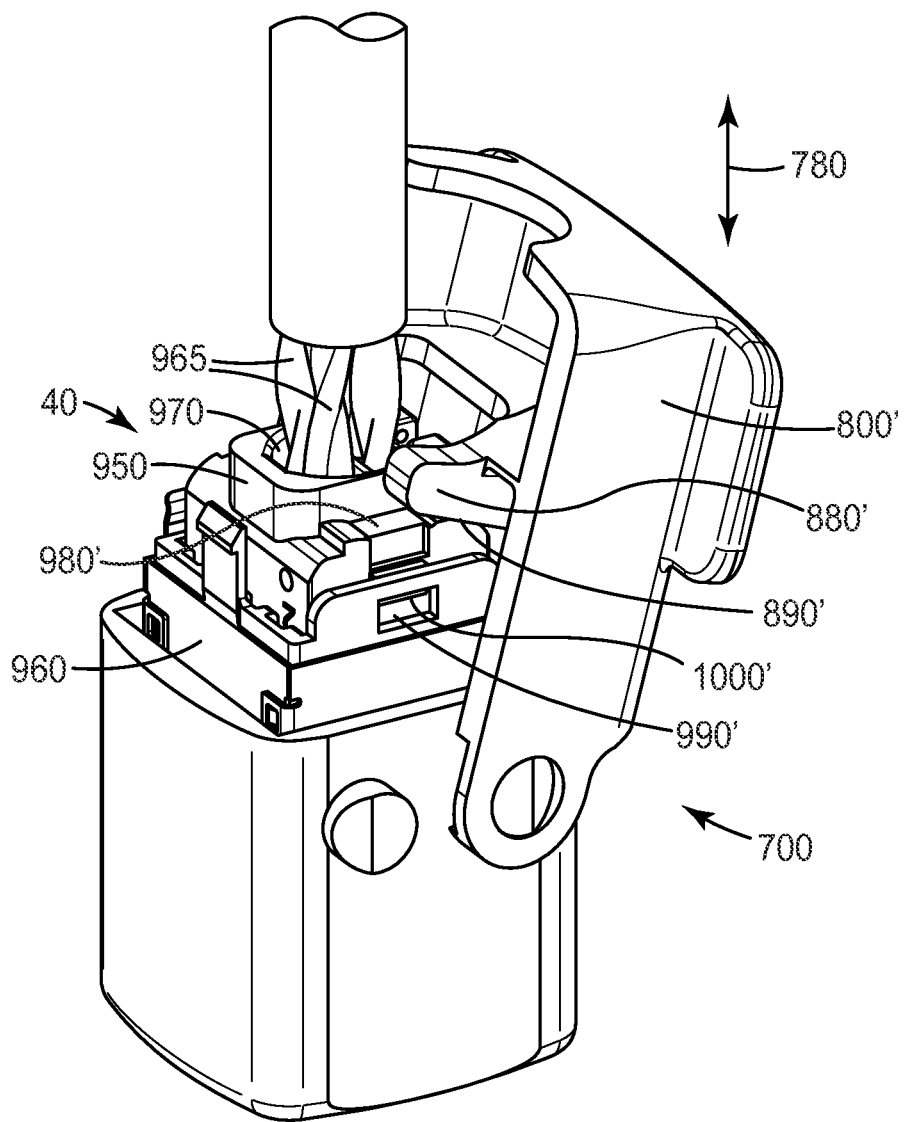
FIG. 8c is another perspective view of the tool and jack of FIG. 8b, with the wire organized partly inserted and the tool almost closed.

FIG. 8c shows the termination tool 700 in its open position, with a telecommunications jack 40 inserted into the cavity 750 of the tool 700. For clarity, only one actuator 800' is shown. This Figure shows details of the rear portion of the jack 40. The wire organizer 950 is partly inserted into the body 960 of the jack 40. The wires 965 enter the jack 40 through a circular wire opening 970 at the back of the jack 40. The wire organizer 950 has two sliding surfaces 980, 980', one located on one side of the opening 970, the other one located on the opposite side of the opening 970 (only the sliding surface 980' being visible in FIG. 8c). They are located symmetrical to each other with respect to an axis in the orientation of arrow 780 through the center of the opening 970. The sliding surface 980' is mechanically contacted by the front surface 890' of the lever 880', whereas the sliding surface 980 is mechanically contacted by the front surface 890 of the lever 880 (not visible in this Figure), when the actuators 800 and 800' are pivoted towards each other into the closed position of the tool 700.

The interaction between a sliding surface 980, 980' and the respective lever front surface 890, 890' is both a sliding and a pushing interaction. Upon transition of the tool 700 from its open position into its closed position, the middle part of the lever 880', located approximately half-way along the lever 880' between its one end attached to wall 870 and its other end, will first contact the sliding surface 980', push the wire organizer 950 slightly deeper into the body 960 of the jack 40. As the tool 700 is closed further, the contact point between the lever 880' and the sliding surface 980' will be closer to the wall 870 and the wire organizer 950 will enter deeper into the body 960 of jack 40. When tool 700 is in its fully-closed position (shown in FIG. 8d), wire organizer 950 is inserted deep enough into body 960 of the jack 40 so that the latch protrusion 990' engages with the elastic latch 1000' and the other latch protrusion 990 (not visible) engages with the other elastic latch 1000, so as to fix the wire organizer 950 in its fully-inserted position.

It has been mentioned above that the actuators 800 and 800' of the tool 700 have an identical shape in the embodiment shown in FIGS. 8a-8d. As the actuator 800 is arranged opposite to actuator 800', and their respective pivot axes are parallel and located close to each other, the lateral offset of the position of the levers 880 and 880' implies that they push the wire organizer 950 into the body of the jack 40 in different sliding surfaces 980, 980' respectively, which are located symmetrically around the central axis of the jack 40. The wire organizer 950 is thus pushed evenly into the body of the jack 40, avoiding canting and jamming.

By pivoting both actuators 800 and 800' towards each other completely, i.e. by bringing the tool 700 from an open position into a closed position, the levers 880, 880' contact the respective sliding surfaces 980, 980' with their respective front surfaces 890, 890', and as the tool 700 closes completely, the levers 880, 880' press the wire organizer 950 into the body 960 of the jack 40, which in turn presses the wires 965 into respective slits of insulation displacement contacts (not shown), thereby establishing a secure connection with the contacts of the jack 40.

Figure 8D:
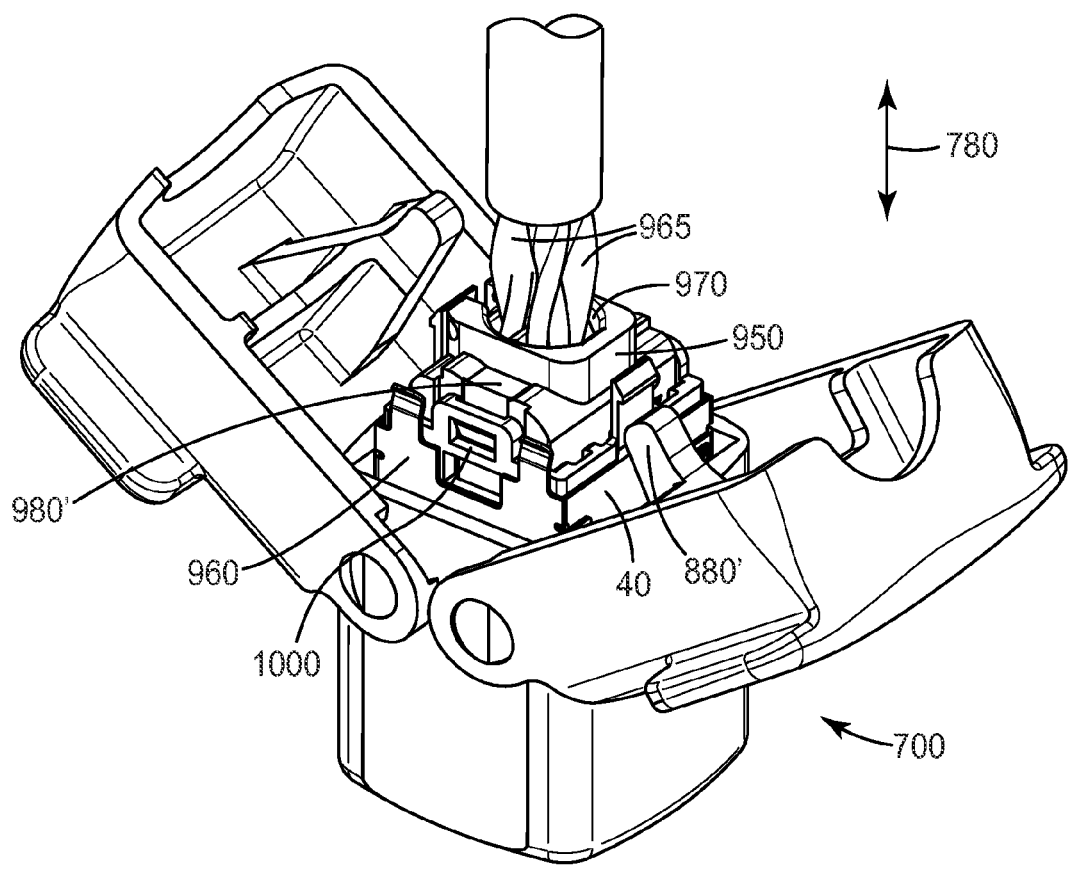
FIG. 8d, in a similar view, shows the tool with the wire organized fully inserted into the jack, and the actuators reopened.

FIG. 8d shows the tool 700 and the jack 40, connected to wires 965, after actuation of the tool. For clarity of the Figure, the actuators 800, 800' have been re-opened. The Wire organizer 950 is fully pushed into body 960 of jack 40, and elastic latches 1000, 1000' are engaged with latch protrusions 990, 990', respectively, thus securing wire organizer 950 relative to body 960 of jack 40. In this situation, wires 965 are securely connected to respective insulation displacement contacts 1150 (not visible) in jack 40.

Figure 9:
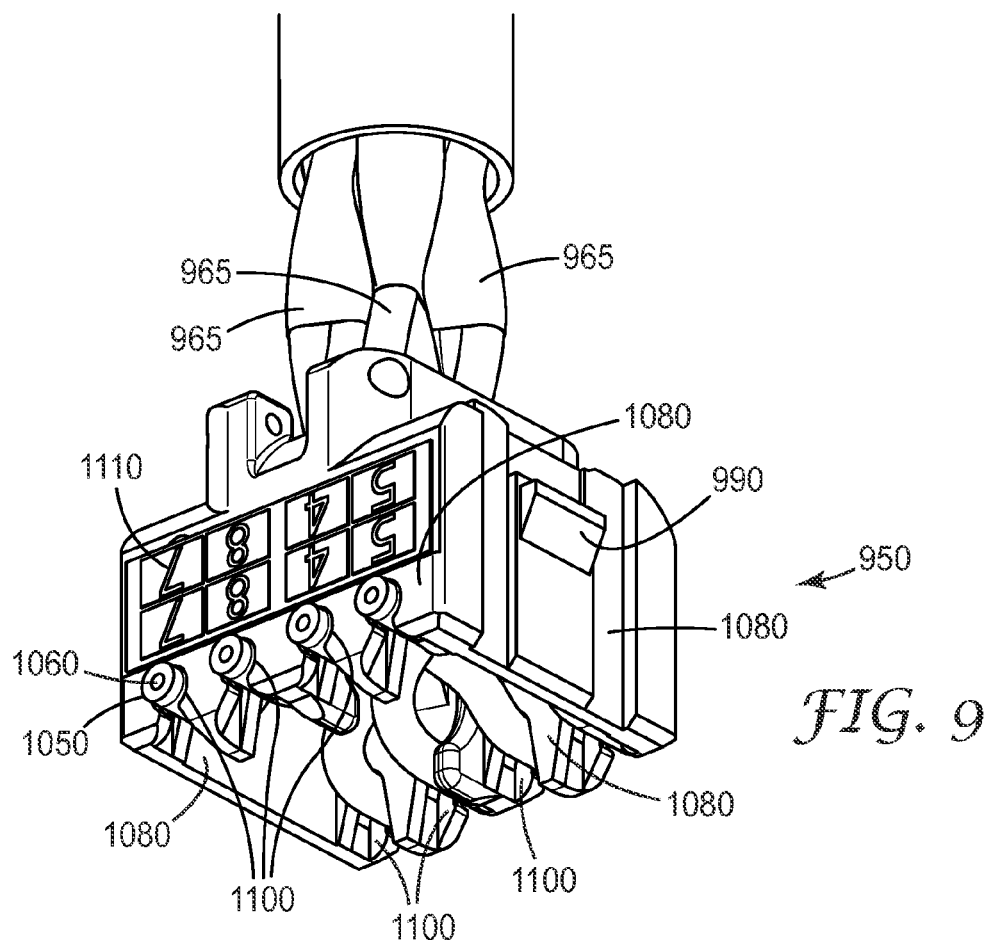
FIG. 9 is a more detailed perspective view of the wire organizer of FIG. 8b.

FIG. 9 is a perspective view of the wire organizer 950 of a modular jack 40, holding the wires 965 in place. The wires 965 enter the wire organizer 950 through its wire opening 970 (not visible in this Figure). Each wire has an insulating sheath 1050 and a conductive strand 1060. The inner space of the wire organizer 950 is surrounded by walls 1080. Two of these have recesses 1100, each of which holds the end of one wire 965 in place by engaging with the insulating sheath 1050 of the wire 965. When the wire organizer 950, with the wires 965 held in place in it, is pushed into the body 960 of the jack 40, the part of each wire 965, next to the recess 1100 by which it is held in place, is pushed into an insulation displacement contact 1150 of the modular jack 40, whereby each wire 965 is secured to a respective insulation displacement contact 1150 and an electrical contact is established between the conductive strand 1060 of the wire 965 and the insulation displacement contact 1150.

The wire organizer 950 is made from a polymeric, non-conductive material. Those walls 1080 having recesses 1100 for holding wires 965 in place are provided with indicia 1110 which serve to indicate the different wire locations.

Figure 10:
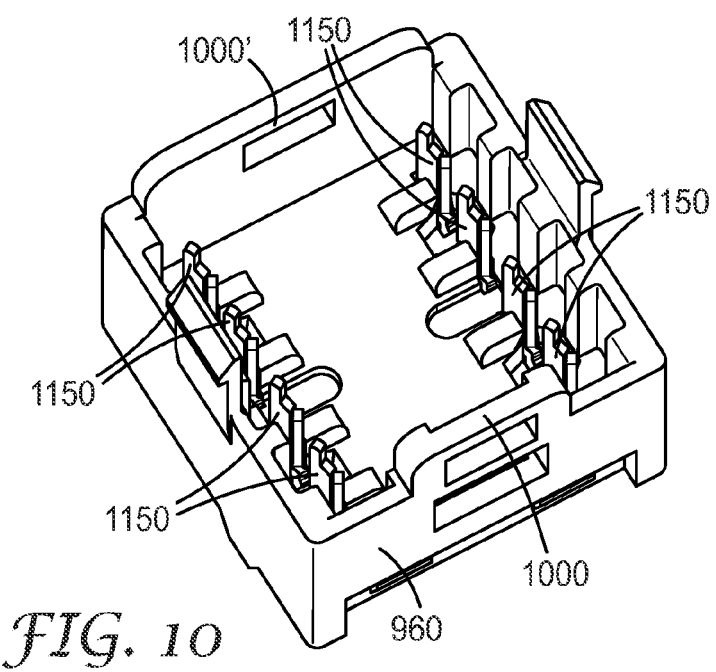
FIG. 10 is a perspective view of the part of the jack of FIG. 8b comprising the insulation displacement contacts.

FIG. 10 is a perspective view of a part of the jack 40, showing the insulation displacement contacts 1150 in the body 960 of the jack 40, to which the wires 965 are secured when the wire termination tool 700 pushes the wire organizer 950 into the body 960 of the jack 40. When the levers 880, 880' of tool 700 have pushed the wire organizer 950 completely into the body 960 of the jack 40 so that the wires 965 have been secured to respective insulation displacement contacts 1150, the two latches 1000, 1000' of the jack 40 engage with the respective latch protrusions 990, 990' of the wire organizer 950 to secure the wire organizer 950 relative to the jack body 960.

The invention claimed is:

1. A jack support structure for fixing a plurality of modular telecommunications jacks on a patch panel,
    wherein the jack support structure comprises
    at least two parallel rows of jack cavities, and
    fixing means for fixing the jack support structure on a patch panel, characterized by
    the fixing means being positioned only between two adjacent rows of jack cavities.

2. A jack support structure according to claim 1, wherein the jack support structure comprises a release actuator operable to release the jack support structure from the patch panel.

3. A jack support structure according to claim 2, wherein the release actuator comprises two arms, such that the jack support structure is released when both arms are moved towards each other.

4. A jack support structure according to claim 2, further comprising a movable inhibitor that, in a first position on the support structure, inhibits actuation of the release actuator, and, in a second position on the support structure, allows actuation of the release actuator.

5. A jack support structure according to claim 4, wherein the inhibitor has an indicia-receiving surface.

6. A jack support structure according to claim 1, further comprising a contact for electrically connecting a conductive part of a modular telecommunications jack to a conductive part of the patch panel.

7. A jack support structure according to claim 6, wherein the contact has a first arm for contacting a jack in the support structure, and a second arm for contacting a patch panel to which the support structure is fixed.

8. A jack support structure according to claim 6, wherein the contact is accommodated in a central wall between adjacent rows of jack cavities.

9. A jack support structure according to claim 1, wherein the modular telecommunications jack (40) is fixable to the jack support structure (10) by inserting the jack into the jack support structure (10) from a rear side of the jack support structure (10), which side faces the interior of a patch panel (20) on which the jack support structure (10) is to be fixed.

10. A jack support structure according to claim 1, wherein the jack support structure comprises two central walls,
 located between two adjacent rows of jack cavities,
 the walls having major surfaces that are parallel to each other and parallel to the rows,
 the walls being suitably spaced to receive, in the space between them, a flat support element of a patch panel to which the jack support structure is to be fixed,
 whereby the central walls limit the movement of the jack support structure relative to the flat support element in a direction perpendicular to the major surfaces of the walls.

11. A jack support structure according to claim 10, wherein the central walls are spaced such that the open distance between them is essentially equal to the thickness of a flat support element of the patch panel, to which the jack support structure is to be fixed.

12. Combination of a jack support structure according to claim 1 and a patch panel, wherein the patch panel comprises a flat support element that fits between two adjacent rows of jack cavities of the jack support structure.

13. The combination of claim 12, wherein the support element has at least one recess in an edge, defining the location of the jack support structure(s) fixed thereon.

14. The combination of claim 12, wherein the jack support structure can be fixed on the patch panel by inserting the jack support structure into the patch panel in a direction towards the interior of the patch panel.

\* \* \* \* \*